United States Patent
Ding

(10) Patent No.: US 8,275,316 B2
(45) Date of Patent: Sep. 25, 2012

(54) METHOD AND SYSTEM FOR A FAST POWER CONTROL MECHANISM FOR BLUETOOTH DEVICES

(75) Inventor: Shawn Ding, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 170 days.

(21) Appl. No.: 12/700,997

(22) Filed: Feb. 5, 2010

(65) Prior Publication Data

US 2010/0203838 A1 Aug. 12, 2010

Related U.S. Application Data

(60) Provisional application No. 61/150,606, filed on Feb. 6, 2009.

(51) Int. Cl.
*H04B 7/00* (2006.01)
*H04M 1/00* (2006.01)

(52) U.S. Cl. ............ 455/41.2; 455/41.1; 455/41.3; 455/13.4; 455/552.1

(58) Field of Classification Search ............ 455/41.1–3, 455/13.4, 522
See application file for complete search history.

(56) References Cited

U.S. PATENT DOCUMENTS

| | | | |
|---|---|---|---|
| 6,760,317 B1* | 7/2004 | Honkanen et al. | 370/329 |
| 2002/0111178 A1* | 8/2002 | Park | 455/507 |
| 2004/0242258 A1* | 12/2004 | Kim | 455/522 |
| 2006/0056356 A1* | 3/2006 | Arvelo | 455/69 |
| 2006/0223445 A1* | 10/2006 | Baker et al. | 455/69 |
| 2007/0270098 A1* | 11/2007 | Chen et al. | 455/41.2 |
| 2010/0009624 A1* | 1/2010 | Youn et al. | 455/9 |

OTHER PUBLICATIONS

"Specification of the Bluetooth System" Master Table of Contents & Compliance Requirements, Specification vol. 0, pp. 235-236.

* cited by examiner

*Primary Examiner* — Wen Huang
(74) *Attorney, Agent, or Firm* — Thomas, Kayden, Horstemeyer & Risley, LLP

(57) ABSTRACT

Aspects of a method and system for a fast power control mechanism for Bluetooth devices may include receiving from a first Bluetooth device, a request for a transmit power adjustment for one or more operating modes. A step size may be received for the transmit power adjustment via the received request. The transmit power may be adjusted as a function of the step size. A feedback message may be sent to the first Bluetooth device, wherein the feedback message may indicate a status of the adjusting. The transmit power adjustment may be requested via a Link Management Protocol (LMP) message. One or more operating modes may comprise a Bluetooth Basic Rate (BR) mode, and/or a Bluetooth Enhanced Data Rate (EDR) mode.

24 Claims, 8 Drawing Sheets

METHOD AND SYSTEM FOR A FAST POWER CONTROL MECHANISM FOR BLUETOOTH DEVICES

CROSS-REFERENCE TO RELATED APPLICATIONS/INCORPORATION BY REFERENCE

This application makes reference to, claims priority to, and claims the benefit of U.S. Provisional Application Ser. No. 61/150,606, filed on Feb. 6, 2009.

The above referenced application is hereby incorporated herein by reference in its entirety.

FIELD OF THE INVENTION

Certain embodiments of the invention relate to signal processing for communication systems. More specifically, certain embodiments of the invention relate to a method and system for a fast power control mechanism for Bluetooth devices.

BACKGROUND OF THE INVENTION

Bluetooth wireless technology offers personal connectivity and provides freedom from wired connections. Bluetooth is a specification for a small form-factor, low-cost radio solution providing links between mobile computers, mobile phones and other portable, handheld devices.

Bluetooth wireless technology is an international, open standard for allowing intelligent devices to communicate with each other through wireless, short-range radio links. This technology allows Bluetooth compliant devices such as computers, cell phones, keyboards and/or headphones to establish connections, without wires, cables or any direct action from a user. Bluetooth is currently incorporated into numerous commercial products including laptops, Personal Digital Assistants (PDAs), cell phones, and printers, with more products being released every day.

Modern portable devices increasingly provide converged functionality of many devices that used to be separate entities. For example, it is now common to find PDA, cell phone and portable music player converged into a single device. Such multi-modal devices often comprise a variety of functional blocks to fulfill various tasks and several functional blocks and/or chipsets may access Bluetooth functionality.

A Bluetooth system normally comprises a Bluetooth host that may be part of a functional block, and a Bluetooth host controller. The Bluetooth host may, for example, be a GSM (Global System for Mobile Communications) chipset or functional block. The Bluetooth host provides a high level interface between a Bluetooth command set and a core application furnished by the Bluetooth host. A Bluetooth host may be coupled to a Bluetooth host controller via a host controller interface (HCI). The Bluetooth host controller comprises the baseband and RF portion of the Bluetooth system, that is, the actual radio part that may be connected to the Bluetooth antenna. If, for example, the Bluetooth host is a GSM block and there is also a multimedia decoder block that may need to stream music to a pair of Bluetooth headphones, the multimedia decoder will send the audio data to the Bluetooth Host in the GSM block to be forwarded to the Bluetooth Host controller.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a fast power control mechanism for Bluetooth devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a fast power control mechanism for Bluetooth devices. Exemplary aspects of the method and system for a fast power control mechanism for Bluetooth devices may comprise performing using one or more processors and/or circuits in a second Bluetooth device, receiving from a first Bluetooth device, a request for a transmit power adjustment for one or more operating modes. A step size may be received for the transmit power adjustment via the received request. The transmit power adjustment may occur as a function of the step size. A feedback message may be sent to the first Bluetooth device, where the feedback message may indicate a status of the adjustment. The transmit power adjustment may be requested via a Link Management Protocol (LMP) message. One or more operating modes may comprise a Bluetooth Basic Rate (BR) mode, and/or a Bluetooth Enhanced Data Rate (EDR) mode. The received step size may be encoded in one or more bits of a reserved byte in the received request, and may be encoded utilizing 4 bits. It may be determined whether the first Bluetooth device is operable to utilize fast power control, and then an increase power message and/or the step size corresponding to the increase power message may be generated and/or received. It may be determined whether the first Bluetooth device is operable to utilize fast power control, and then a decrease power message and/or the step size corresponding to the decrease power message may be generated and/or received.

Figure 1A:
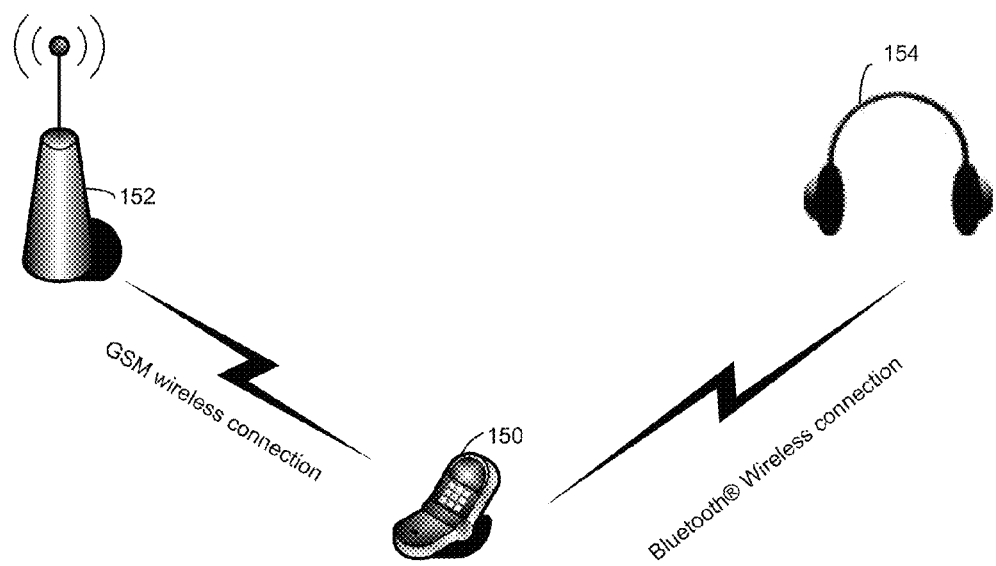
FIG. 1A is a diagram illustrating an exemplary communications system utilizing Bluetooth, in accordance with an embodiment of the invention.

FIG. 1A is a diagram illustrating an exemplary communications system utilizing Bluetooth, in accordance with an embodiment of the invention. Referring to FIG. 1A, there is shown a GSM handset 150, a GSM base station 152 and Bluetooth headphones 154. There is also shown a GSM wireless connection and a Bluetooth wireless connection.

The GSM handset 150 may comprise suitable logic, circuitry, interfaces and/or code that may be operable to wirelessly communicate data, including but not limited to voice. The GSM base station 152 may comprise suitable logic, circuitry, interfaces and/or code that may be operable to wirelessly communicate data, including but not limited to voice. The Bluetooth headphones 154 may comprise suitable logic, circuitry, interfaces, and/or code that may be operable to wirelessly communicate data, including but not limited to voice.

Many modern mobile devices may comprise Bluetooth functionality and/or possess the capability to utilize Bluetooth via a plug-in adapter. For example, Global System for Mobile Communications (GSM) handsets may comprise Bluetooth blocks to connect to a large variety of peripheral devices. In FIG. 1A, an exemplary GSM headset 150 may be operable to utilize a Bluetooth wireless connection to connect and communicate with the Bluetooth headphones 154.

In addition to its core telephone functionality, the GSM handset 150 may comprise further functional blocks and/or chipsets to provide additional functionality. For example, the GSM handset 150 may comprise an audio decoder block that may efficiently decode a number of music formats. In order for the user of the GSM handset 150 to listen to audio decoded by the audio block on the Bluetooth headphones 154, the GSM handset 150 may forward audio data from the audio block over its Bluetooth stack to the Bluetooth headphones 154.

When the channel conditions for a Bluetooth wireless connection, for example between GSM handset 150 and Bluetooth headphones 154 may change, it may be desirable to adjust the data rates. In some instances, in particular if the channel conditions may not change very quickly, it may be desirable to use a same transmission power increase/decrease step size for all power changes. In these instances, because the step size may be fixed, no step size information need be fed back from the receiver to the transmitter. In instances where the data rates may need to be adjusted rapidly, it may be more efficient to feedback a variable step size for the transmission power control, so that the channel variations may be tracked closely.

Figure 1B:
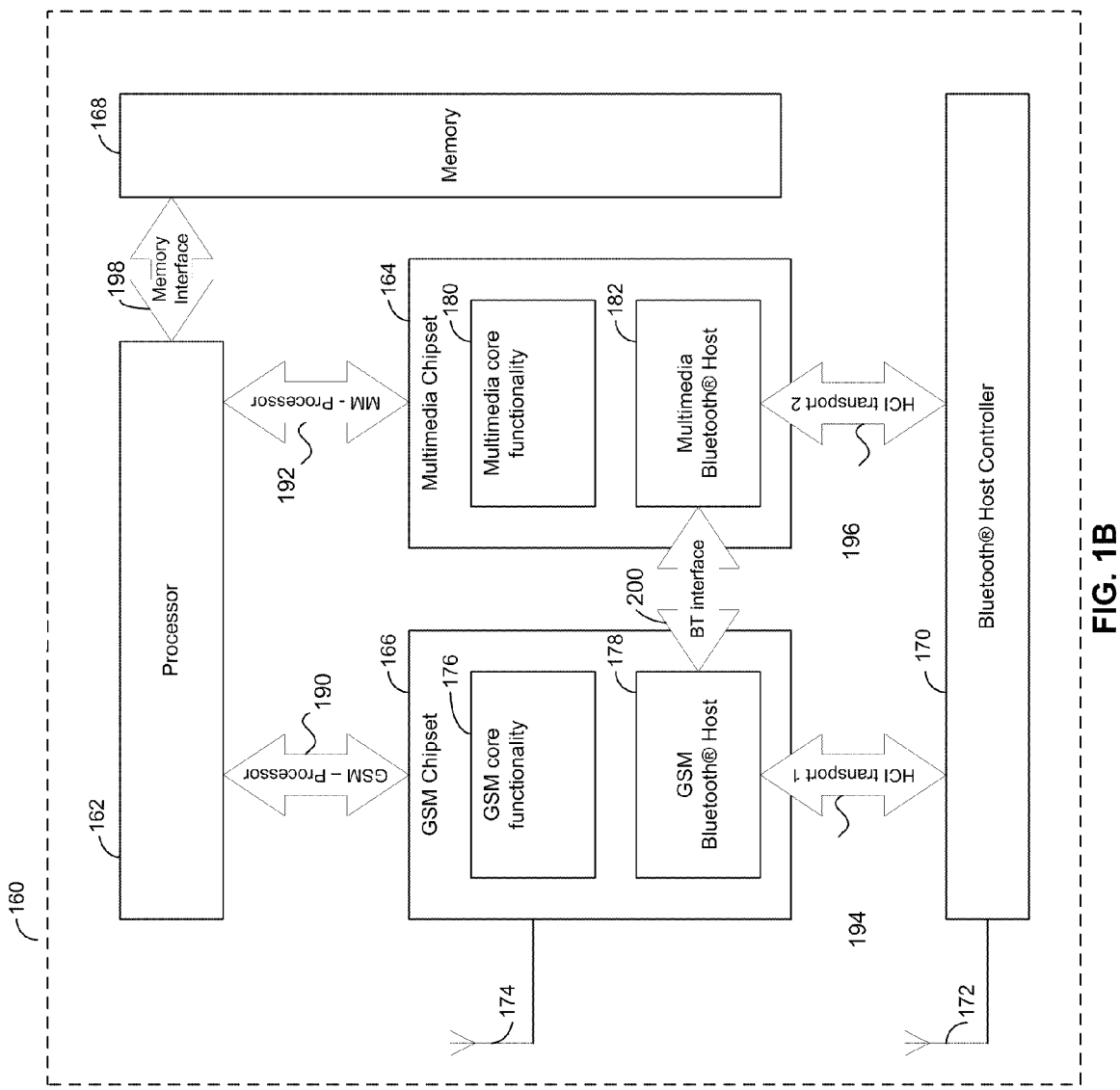
FIG. 1B is a block diagram illustrating an exemplary GSM handset with multiple Bluetooth hosts, in accordance with an embodiment of the invention.

FIG. 1B is a block diagram illustrating an exemplary GSM handset with multiple Bluetooth hosts, in accordance with an embodiment of the invention. Referring to FIG. 1B, there is shown a GSM handset 160, comprising a processor 162, system memory 168, a GSM block 166, a multimedia block 164, a Bluetooth host controller 170, a GSM antenna 174 and a Bluetooth antenna 172. The GSM block 166 may comprise a GSM core functionality block 176 and a GSM Bluetooth Host 178. The multimedia block 164 may comprise a multimedia core functionality block 180 and a multimedia Bluetooth host 182. There is also shown a GSM-processor interface 190, a multimedia (MM)-processor interface 192, a memory interface 198, a Bluetooth (BT) interface 200, and host controller interface (HCI) transport 1 194 and HCI transport 2 196. The processor 162 may be a main processor or a baseband processor, for example.

The GSM handset 160 may comprise suitable logic, circuitry, interfaces and/or code that may be operable to wirelessly communicate data, including but not limited to voice. In one embodiment of the invention, the GSM block 166, the system memory 168, the multimedia block 164, processor 162, Bluetooth host controller 170, the GSM antenna 174 and the Bluetooth antenna 172 may be functional blocks of a single chipset.

The processor 162 may comprise suitable logic, circuitry, interfaces and/or code that may be operable to control the GSM handset 160, for example by utilizing system memory 168 via the memory interface 198. The processor 162 may control the high-level functionality of the GSM handset 160, for example, the user interface, and access to the GSM block 166 and the multimedia block 164. Access to the GSM block 166 and the multimedia block 164 may occur via the GSM-processor interface 190 and the MM-processor interface 192, respectively. In another embodiment of the invention, the functional blocks may each be a chip or some functional blocks may be combined into a chip.

The system memory 168 may comprise suitable logic, circuitry, interfaces and/or code that may be operable to store and retrieve data sent to and from the processor 162 via the memory interface 198.

The GSM block 166 may comprise suitable logic, circuitry, interfaces and/or code that may be operable to control and operate a GSM radio interface, which may comprise generating radio-frequency signal for transmission via antenna 174, and/or GSM core functionality block 176, and/or a GSM Bluetooth host 178. The processor 162 may access to the GSM block 166 and the multimedia block 164 may occur via the GSM-processor interface 190 and the MM-processor interface 192, respectively. The GSM block 166 may provide the core mobile telephone functionality of the GSM handset 160 in the GSM core functionality block 176. The GSM block 166 may also be communicatively coupled to the GSM antenna 174. In addition, the GSM block 166 may comprise a GSM Bluetooth host 178 that may be used, for example, to connect to peripheral devices like headsets.

The GSM core functionality block 176 may comprise suitable logic, circuitry, interfaces and/or code that may be operable to generate, and process GSM signals.

The GSM Bluetooth Host 178 may comprise suitable logic, circuitry, interfaces and/or code that may be operable to generate and process signals related to the control and provide date with regard to Bluetooth functionality. The GSM Bluetooth host 178 in the GSM block 166 may also communicate directly with the Bluetooth host controller 170 via the HCI transport 1.

The multimedia block 164 may comprise suitable logic, circuitry, interfaces and/or code that may be operable to process multimedia signals and access the GSM block 166, the Bluetooth host controller 170, and the processor 162, via the MM-processor interface 192, HCI transport 2 196, and the BT interface 200, respectively. The multimedia block 164 may provide, for example, audio and video decoding for the GSM handset 160. The multimedia block 164 may comprise a multimedia Bluetooth host 182 that may communicate directly with the Bluetooth host controller 170 via the HCI transport 2 196 and the GSM Bluetooth host 178 via the Bluetooth interface 200.

The multimedia core functionality block 180 may comprise suitable logic, circuitry, interfaces and/or code that may be operable to generate and process multimedia signals.

The multimedia Bluetooth host 182 may comprise suitable logic, circuitry, interfaces and/or code that may be operable to generate and process signals related to the Bluetooth functionality of the GSM handset 160. The multimedia Bluetooth host 182 may interface the GSM Bluetooth host 178 via the BT interface 200, and the Bluetooth host controller 170 via the HCI transport 2 196.

The Bluetooth host controller 170 may comprise suitable logic, circuitry, interfaces and/or code that may be operable to generate, receive and/or process a radio portion of the Bluetooth radio of the GSM handset 160, and may be communicatively coupled to a Bluetooth antenna 172.

The GSM antenna 174 may comprise suitable logic, circuitry, interfaces and/or code that may be operable to transmit and receive radio frequency signals that might be suitable for GSM communication. The GSM antenna 174 may be communicatively coupled to the GSM Chipset 166.

The Bluetooth antenna 172 may comprise suitable logic, circuitry, interfaces and/or code that may be operable to transmit and receive radio frequency signals that might be suitable for Bluetooth communications. The Bluetooth antenna 172 may be communicatively coupled to the Bluetooth host controller 172.

In operation, the processor 162 may control the overall functionality of the GSM handset 160. For example, the processor 162 may process signals and information from the GMS chipset 166 and/or the multimedia chips set 164 via the GSM-processor interface 190 and the MM-processor interface 192, respectively. In instances of Bluetooth communication, the multimedia chipset 164 and the GSM chipset 166 may transfer and suitably process data generated or controlled by the processor 162 via the HCI transport 1 194 and the HCI transport 2 196, respectively.

When the channel conditions for a Bluetooth wireless connection, for example between GSM handset 150 and Bluetooth headphones 154 may change, it may be desirable to adjust the Bluetooth data rates in the GSM handset 160. In particular, it may be desirable to adjust the data rates via the Bluetooth host controller 170 to adapt to the changing channel conditions. In some instances, in particular if the channel conditions may not change very quickly, it may be desirable to use a same transmission power increase/decrease step size for all power changes. In these instances, because the step size may be fixed, no step size information may have to be fed back from a receiver, for example a receiver in the GSM handset 150 or the Bluetooth headphones 154, to the transmitter, for example a receiver in the GSM handset 150 or the Bluetooth headphones 154. In instances where the data rates may need to be adjusted rapidly, it may be more efficient to feed back a variable step size for the transmission power control, so that the channel variations may be tracked closely.

While FIG. 1B depicts an exemplary GSM handset 160, it may be envisaged that the wireless system in FIG. 1B may comprise any number of functional block combinations with multiple Bluetooth hosts. For example, an IEEE 802.11 WLAN block, a CDMA block or a WIMAX block may replace the GSM block 166 and a video block, an FM radio block, a keyboard controller block or a photo camera block may replace the multimedia block 164. These functional blocks may or may not be comprised within a single chip.

Figure 2:
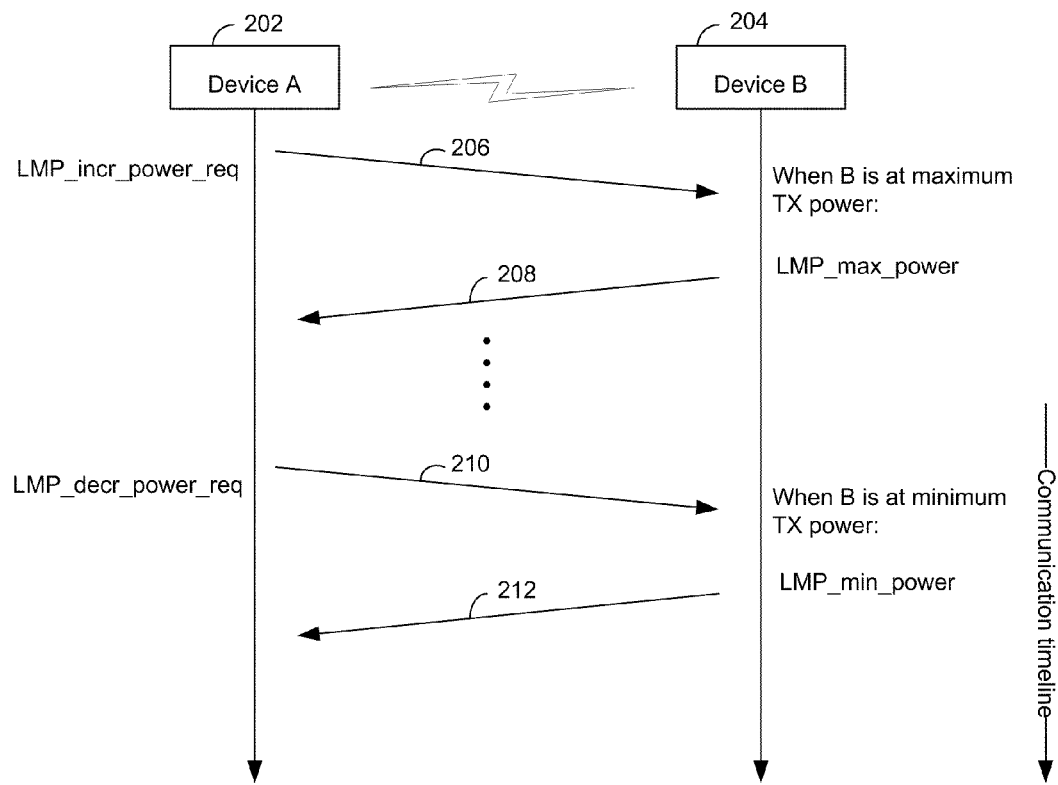
FIG. 2 illustrates exemplary communication between communicating Bluetooth devices via a Link Management Protocol, in accordance with an embodiment of the invention.

FIG. 2 illustrates exemplary communication between communicating Bluetooth devices via a Link Management Protocol, in accordance with an embodiment of the invention. Referring to FIG. 2, there is shown a device A 202, and a device B 204. The device A 202 and device B 204 may comprise suitable logic, circuitry, interfaces, and/or code that may be operable to communicate with other Bluetooth devices via radio-interface interface. The device A 202 and device B 204 may be compliant with Bluetooth 2.1, for example, which may be backwards compatible with Bluetooth 1.2 devices.

Power control may be required for Bluetooth Class 1 devices in the Bluetooth 2.1+Enhanced Data Rate (EDR) specification. Power control may be used for limiting the transmitted power in accordance with transmit conditions between device A 202 and device B 204. Power step sizes to increment or decrement transmit power at device A 202 and/or device B 204 may typically range from 2 dB to 8 dB. In a radio connection between Bluetooth devices, the output transmit power may not exceed the maximum output power of the Bluetooth power class 2 for transmitting packets, when a receiving device does not support the necessary messaging for sending power control messages. Bluetooth devices may not exceed the maximum allowed transmit power levels set by controlling regulatory bodies. The maximum allowed transmit power level may depend upon the modulation mode. For example, in transmission 206, the device A 202 may transmit a Link Management Protocol (LMP) message 206 to the device B 204, which may request an increase in transmission power from the device B 204. Such a message may be referred to as a LMP increase power request (LMP_incr_power_req) message.

In instances when the device B 204, which is already set to operate at maximum transmission power, receives the LMP_incr_power_req, the device B 204 may send a message 208, which indicates that the device B 204 may already be transmitting at maximum transmission power. The message 208 may be referred to as a LMP maximum power (LMP_max_power) message, for example. In this instance, the device A 202 may request a power increase again from device B 204 after having requested a power decrease by a LMP decrease power request (LMP_decr_power_req) message, at least once.

The device A 202 may, for example, send a request 210 to decrease transmission power to device B 204, when the device B 204 may already have reached minimum transmission power. The message 210 requesting a decrease in transmission power may be referred to as LMP_decr_power_req. When the transmission power is at a minimum at the device B 204, a message 212 indicating minimum transmission power may be returned to device A 202. This message 212 may be referred to as a LMP minimum transmit power (LMP_min_power) message. In instances when the device B 204 may transmit at minimum power, the device A 202 may request a power decrease utilizing the LMP_decr_power_req message after having requested a power increase using the LMP_incr_power_req message at least once.

In accordance with an embodiment of the invention, a Bluetooth device may comprise five power control steps: for example, 0-4. In some instances, a Bluetooth device may be able to use a reduced set of power steps, based on the modulation employed, for example. In accordance with various embodiments of the invention, power steps 0-4 may be used for Gaussian Frequency-Shift Keying (GFSK), and power steps 0-3 may be used for Phase Shift Keying (PSK). In these instances, and in accordance with various embodiments of the invention, a maximum power reached message LMP_max_power, for example message 210, or a minimum power reached message LMP_min_power, for example message 212, may be returned as a function of the modulation and/or logical transport parameters.

Thus, a Bluetooth device, for example the device A 202 or the device B 204, may have different maximum transmitting (TX) power levels for different modulation modes. The modulation modes may comprise, for example, Bluetooth Basic Rate (BR) and/or Bluetooth Enhanced Date Rate (EDR). A Bluetooth device may have the ability to control its transmission power independently for BR and EDR modulation schemes. A Bluetooth device's power class classification may be separated into BR and EDR power levels, in accordance with various embodiments of the invention, and as described above.

Figure 2B:
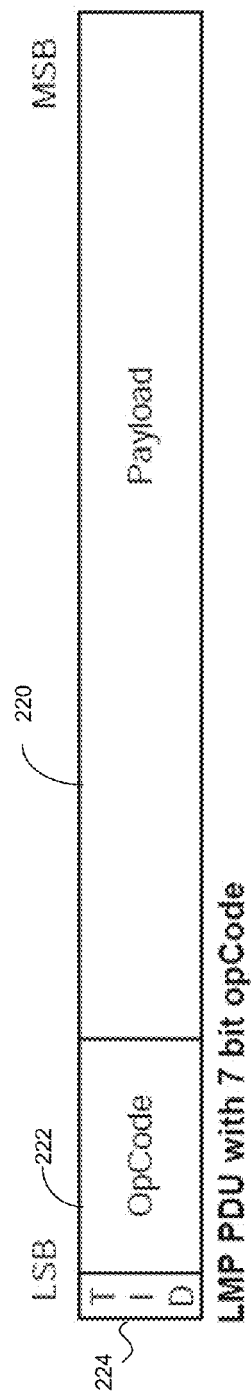

FIG. 2B is an illustration of an exemplary LMP protocol data unit with a short opCode, in accordance with various embodiments of the invention. Referring to FIG. 2B, there is shown a payload 220, and operations code (opCode) 222, and a Transaction Identification (TID) 224. The payload 220 may comprise a Link Management Protocol message, for example LMP_incr_power_req, LMP_decr_power_req, LMP_min_power, and LMP_max_power. The messages in the payload 220 may be structured as described in FIG. 2 and FIGS. 3-5, for example. The payload 220 may comprise any LMP message, however, and is not limited to the ones listed above. The opCode 222 may comprise a code that may indicate the type of message that may be transmitted in the payload. The opCode may be, for example, a 7-bit field. The TID 224 may be used, for example, to identify the message, and may be desirable to avoid duplicate messages.

Figure 2C:
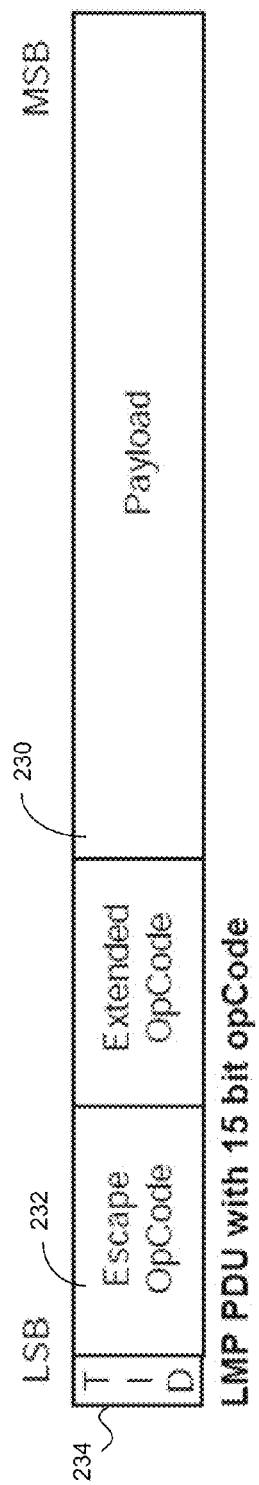

FIG. 2C is an illustration of an exemplary LMP protocol data unit with a long opCode, in accordance with various embodiments of the invention. Referring to FIG. 2C, there is shown a payload 230, and operations code (opCode) 232, and a Transaction Identification (TID) 234. The payload 230 may comprise a Link Management Protocol message, for example LMP_incr_power_req or LMP_decr_power req. The messages in the payload 230 may be structured as described in FIG. 2 and FIGS. 3-5, for example. The payload 230 may comprise any LMP message, however, and is not limited to the ones listed above. The opCode 232 may comprise a code that may indicate the type of message that may be transmitted in the payload. The opCode may be, for example, a 15-bit field. The TID 234 may be used, for example, to identify the message, and may be desirable to avoid duplicate messages.

Figure 3:
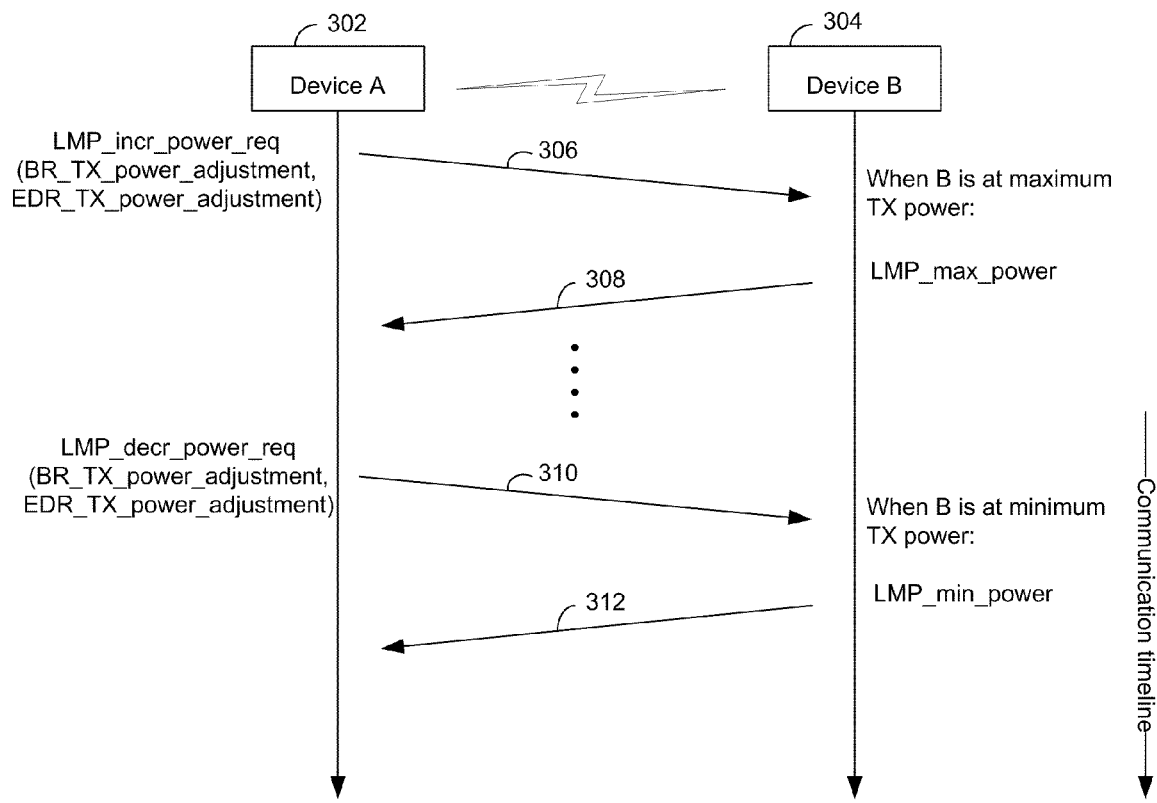
FIG. 3 illustrates exemplary communication between communicating Bluetooth devices via a Link Management Protocol, in accordance with an embodiment of the invention.

FIG. 3 illustrates exemplary communication between communicating Bluetooth devices via a Link Management Protocol, in accordance with an embodiment of the invention. Referring to FIG. 3, there is shown a device A 302, and a device B 304.

The device A 302 and device B 304 may comprise suitable logic, circuitry, interfaces, and/or code that may be operable to communicate with other Bluetooth devices via radio-interface interface. The devices A 302 and device B 304 may be compliant with Bluetooth 2.1, for example, which may be backwards compatible with Bluetooth 1.2 devices.

The request messages to increase or decrease transmission power, LMP_incr_power_req and LMP_decr_power_req, may comprise a one-byte reserved field, in accordance with Bluetooth standard 1.2, for example. LMP messages may be carried in the payload 220 or payload 230, as illustrated in FIG. 2B or FIG. 2C, respectively. In accordance with an embodiment of the invention, the one-byte reserved field in LMP_incr_power_req 306 and LMP_decr_power_req 310 may be utilized for power control. For a power increase message, LMP_incr_power_req 306, bit 0-bit 3 of the reserved one-byte field may be used to represent a base rate transmit power adjustment, BR_TX_power_adjustment, and bit 4-bit 7 of the reserved one-byte field may represent an Enhanced Data Rate transmit power adjustment, EDR_TX_power_adjustment. Similarly, for a power decrease message, LMP_decr_power_req 310, bit 0-bit 3 may represent BR_TX_power_adjustment and bit 4-bit 7 may represent EDR_TX_power_adjustment. For the BR_TX_power_adjustment, the power adjustment may occur in 2 dB steps, for example. The range may depend on the LMP message, for example.

In accordance with various embodiments of the invention, LMP_incr_power_req 306 message may comprise a range for the 4 bits of BR_TX_power_adjustment or EDR_TX_power_adjustment of 0-28 dB, in 2 dB steps, and e.g. 0xF (all ones) may indicate to go to the maximum transmission power. Thus, an LMP_incr_power_req 306 message may request a power increase, and indicate a desired step size. Similarly, a LMP_decr_power_req message 310, for example, may use the 4-bit BR_TX_power_adjustment or EDR_TX_power_adjustment field to denote a step size 0-30 dB, in 2 dB steps. In accordance with various embodiments of the invention, the step size shall not be limited to 2 dB, and the number of bits used for a BR_TX_power_adjustment field, or EDR_TX_power_adjustment field shall not be limited to 4 bits.

In another embodiment of the invention, in instances when EDR may not be supported, bit 4-bit 7 of the reserved byte may be set to zero, where zero may represent a zero step size, for example. When a Bluetooth link is not in EDR mode (for example, when a LMP_packet_table_type message may set the link into BR only mode) bit 4-bit 7 may be set to zero, for example. Furthermore, if both fields BR_TX_power_adjustment field and EDR_TX_power_adjustment in the reserved byte are set to zero, for example, an error code "invalid LMP parameters" may be returned. If a requested adjustment field (for BR or EDR) may be set to zero, this may indicate that transmit power for the corresponding modulation scheme should not be lowered or increased from the current setting. Upon baseband acknowledgement (ACK), when it occurs, a receiving device may apply a desired power step within, for example, 80 time slots.

Figure 4:
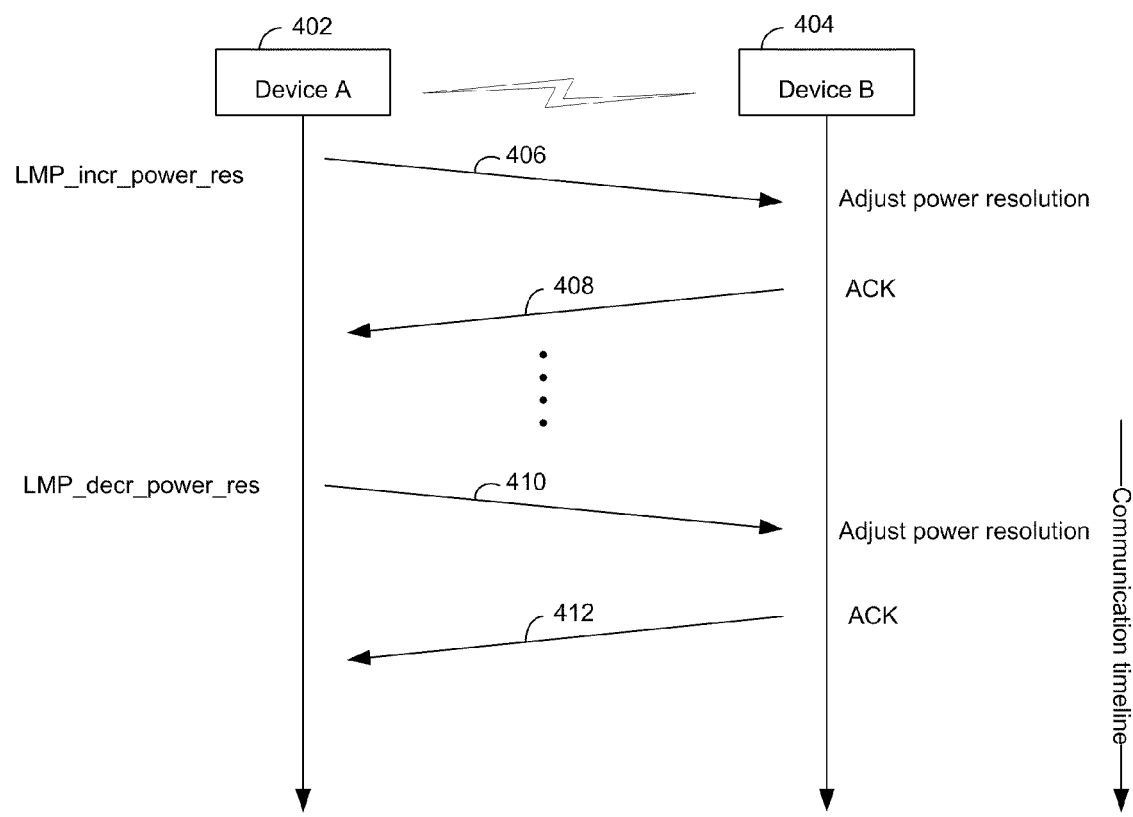
FIG. 4 illustrates exemplary communication between communicating Bluetooth devices via a Link Management Protocol, in accordance with an embodiment of the invention.

FIG. 4 illustrates an exemplary communication between communicating Bluetooth devices via a Link Management Protocol, in accordance with an embodiment of the invention. Referring to FIG. 4, there is shown a device A 402, and a device B 404. The device A 402 and device B 404 may comprise suitable logic, circuitry, interfaces, and/or code that may be operable to communicate with other Bluetooth devices via radio-interface interface. The devices A 402 and device B 404 may be compliant with Bluetooth 2.1, for example, which may be backwards compatible with Bluetooth 1.2 devices.

In another embodiment of the invention, new Link Management Protocol (LMP) messages may be utilized to increase or decrease the power resolution. For example, an LMP increase power resolution LMP_incr_power_res 606 and a LMP decrease power resolution LMP_decr_power_res 410 may utilized. For the LMP_incr_power_res 406, bit 0-bit 3 may represent BR_TX_power_adjustment, which may denote that BR transmit power may increase in 2 dBm steps (0-30), for example. For LMP_incr_power_res 406, bit 4-bit 7 may represent EDR_TX_power_adjustment, which may denote that EDR transmit power may increase in 2 dBm steps (0-30 dB), for example. For the LMP_decr_power_res 410, bit 0-bit 3 may represent BR_TX_power_adjustment, which may denote that BR TX power may decrease in 2 dBm steps (0-30 dB), for example. For the LMP_decr_power_res 410, bit 4-bit 7 may represent EDR_TX_power_adjustment, which may denote that EDR transmit power may decrease in 2 dBm steps (0-30 dB).

In accordance with various embodiments of the invention, in instances were EDR may not be supported, EDR_TX_power_adjustment may be set to zero, which may indicate no change in transmission power. In instances where the achievable transmit power adjustment due to a LMP_incr_power_res 406 message or LMP_decr_power_res 410 message may be less than the requested value for a given modulation method, this may indicate that the maximum or the minimum transmit power has been reached. In these instances, no further non-zero (requiring a change) power increase or decrease LMP messages may be sent for the corresponding data rate (BR or EDR) until a request in the reverse direction of power change may have been sent at least once. In instances when the actual transmit power adjustment in the LMP_incr_power_res 406 or LMP_decr_power_res 410 may be similar to the requested value for the respective modulation method. In these instances, an inference about whether or not maximum or minimum transmit power may have been reached may not be made.

In another embodiment of the invention, one or more new LMP message feature bit(s) may be utilized, for example, for fast power control (FPC), which may be used to indicate that a device may be capable of fast power control. Once both Bluetooth devices, device A 402 and device B 404 are operable to support FPC, the LMP_incr_power_req 306, LMP_incr_power_res 406, LMP_decr_power_req 310, and LMP_dec_power_res 410 messages may be exchanged. In this regard, no new Host Controller (HCI) commands or events may be required. Thus, no host involvement may be necessary for this feature.

Various embodiments of the invention may enable the Bluetooth transmitting device to provide information about its current transmit power level for BR and EDR respectively. Accordingly, various embodiments of the invention may provide a closed loop power control scheme to reach the desired power level faster. Various embodiments of the invention may enable interpretation of existing LMP power control commands.

Figure 5:
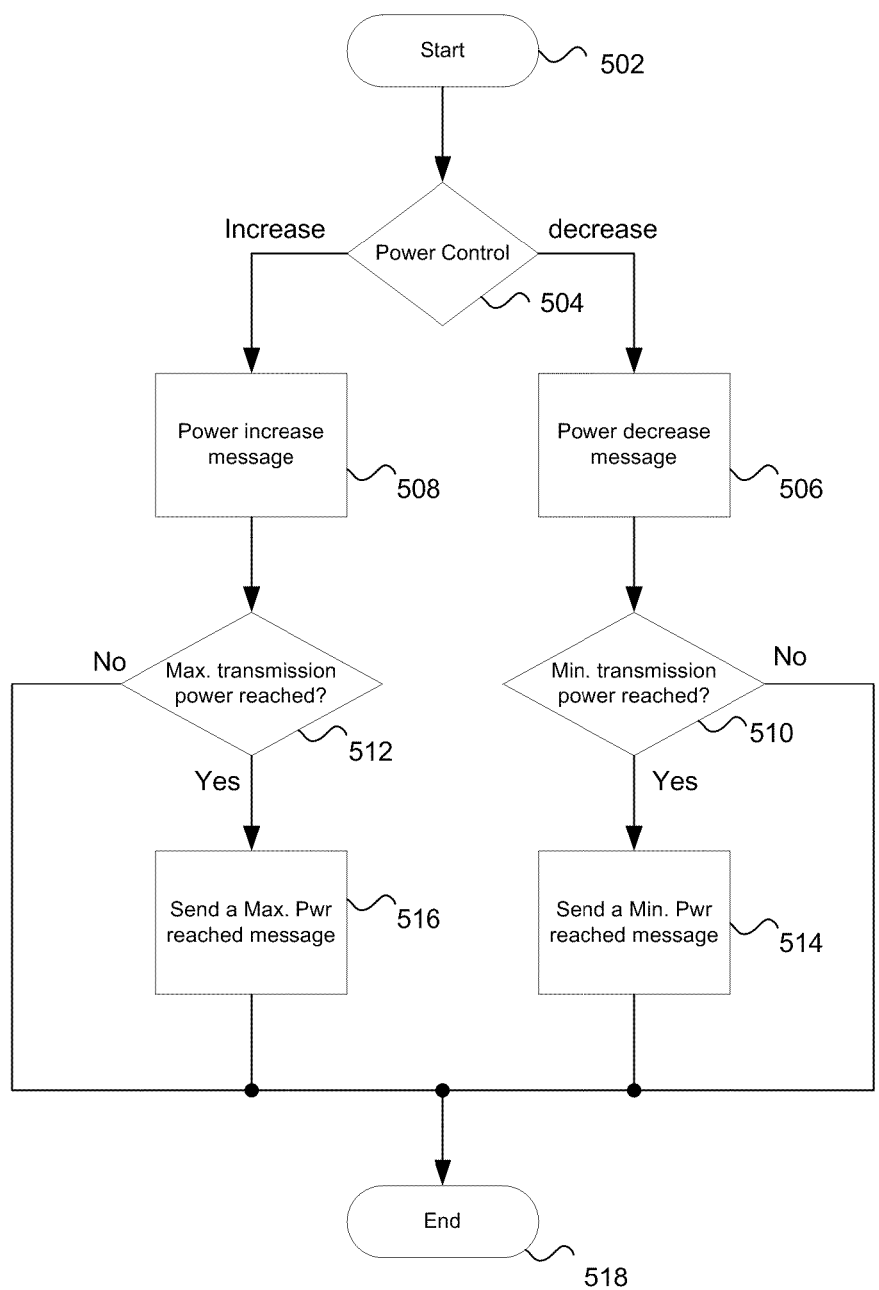
FIG. 5 is a flow chart illustrating exemplary communication between communicating Bluetooth devices via a Link Management Protocol, in accordance with an embodiment of the invention.

FIG. 5 is a flow chart illustrating exemplary communication between communicating Bluetooth devices via a Link Management Protocol, in accordance with an embodiment of the invention.

In step 504, for example based on channel conditions, a power control algorithm may determine when a power increase message or a power decrease message may be sent. In steps 506 and 508, a request message to increase or decrease transmission power, LMP_incr_power_req 508 or LMP_decr_power_req 506, may comprise a one-byte reserved field, in accordance with Bluetooth standard 1.2, for example. LMP messages may be carried in the payload 220 or payload 230, as illustrated in FIG. 2B or FIG. 2C, respectively. In accordance with an embodiment of the invention, the one-byte reserved field in LMP_incr_power_req 508 and LMP_decr_power_req 506 may be utilized for power control. For a power increase message, LMP_incr_power_req 508, bit 0-bit 3 of the reserved one-byte field may be used to represent a base rate transmit power adjustment, BR_TX_power_adjustment, and bit 4-bit 7 of the reserved one-byte field may represent an Enhanced Data Rate transmit power adjustment, EDR_TX_power_adjustment. Similarly, for a power decrease message, LMP_decr_power_req 506, bit 0-bit 3 may represent BR_TX_power_adjustment and bit 4-bit 7 may represent EDR_TX_power_adjustment. For the BR_TX_power_adjustment, the power adjustment may occur in 2 dB steps, for example. The range may depend on the LMP message, for example.

In accordance with various embodiments of the invention, the LMP_incr_power_req 508 message may comprise a range for the 4 bits of BR_TX_power_adjustment or EDR_TX_power_adjustment of 0-28 dB, in 2 dB steps, and e.g. 0xF (all ones) may indicate to go to the maximum transmission power. Thus, an LMP_incr_power_req 508 message may request a power increase, and indicate a desired step size. Similarly, a LMP_decr_power_req message 506, for example, may use the 4-bit BR_TX_power_adjustment or EDR_TX_power_adjustment field to denote a step size 0-30 dB, in 2 dB steps. In accordance with various embodiments of the invention, the step size may not be limited to 2 dB, and the number of bits used for a BR_TX_power_adjustment field, or EDR_TX_power_adjustment field may not be limited to 4 bits.

In another embodiment of the invention, in instances when EDR may not be supported, bit 4-bit 7 of the reserved byte may be set to zero, where zero may represent a zero step size, for example. When a Bluetooth link is not in EDR mode (for example, when a LMP_packet_table_type message may set the link into BR only mode) bit 4-bit 7 may be set to zero, for example. Furthermore, when both fields BR_TX_power_adjustment field and EDR_TX_power_adjustment in the reserved byte are set to zero, for example, an error code "invalid LMP parameters" may be returned. In instances when a requested adjustment field (for BR or EDR) may be set to zero, this may indicate that transmit power for the corresponding modulation scheme should not be lowered or increased from the current setting. Upon occurrence of a baseband acknowledgement (ACK), a receiving device may apply a desired power step within, for example, 80 time slots.

In step 512, when a power increase is requested in step 512 and when the maximum transmission power may have been reached, a message 516 may be returned, indicating that the maximum transmission power has been reached. Similarly, when a power decrease is requested in step 510, and when the minimum transmission power may have been reached, a message 514 may be returned, indicating that the minimum transmission power has been reached.

In accordance with an embodiment of the invention, a method and system for a fast power control mechanism for Bluetooth devices may comprise performing using one or more processors and/or circuits in a second Bluetooth device, for example Headphones 154 receiving from a first Bluetooth device, for example mobile phone 150, a request for a transmit power adjustment for one or more operating modes. As described with respect to FIG. 3, a step size, for example EDR_TX_power_adjustment, may be received for the transmit power adjustment via the received request, for example LMP incr_power_req. The transmit power adjustment may be adjusted as a function of the step size. A feedback message, for example LMP_max_power, may be sent to the first Bluetooth device, wherein the feedback message may indicate a status of the adjusting, as described with respect to FIGS. 3-5. The transmit power adjustment may be requested via a Link Management Protocol (LMP) message, for example LMP_decr_power_req. One or more operating modes may comprise a Bluetooth Basic Rate (BR) mode, and/or a Bluetooth Enhanced Data Rate (EDR) mode. The received step size may be encoded in one or more bits of a reserved byte in the received request, as described with respect to FIGS. 3-5, and may be encoded utilizing 4 bits, for example. As described with respect to FIG. 3 and FIG. 4, it may be determined whether the first Bluetooth device, for example mobile phone 150, is operable to utilize fast power control, and then an increase power message LMP_incr_power_req and/or the step size, for example, BR_TX_power_adjustment corresponding to the increase power message may be generated and/or received. It may be determined whether the first Bluetooth device is operable to utilize fast power control, and then a decrease power message, for example LMP_decr_power_req and/or the step size, for example EDR_TX_power_adjustment, corresponding to the decrease power message may be generated and/or received.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for a method and system for a fast power control mechanism for Bluetooth devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    performing using one or more processors, one or more circuits, or any combination thereof in a second Bluetooth device:
        receiving from a first Bluetooth device, a request for a transmit power adjustment for one or more operating modes, the request including a one-byte reserved field that is reserved according to a Bluetooth specification for a transmit power adjustment request format;
        receiving a step size for said transmit power adjustment via said received request, the step size being encoded in the one-byte reserved field, wherein a first set of bits of the one-byte reserved field are employed for encoding the step size when the transmit power adjustment pertains to a Bluetooth Basic Rate (BR) mode, and a second set of bits of the one-byte reserved field are employed for encoding the step size when the transmit power adjustment pertains to a Bluetooth Enhanced Data Rate (EDR) mode;
        adjusting said transmit power as a function of said step size; and
        sending a feedback message to said first Bluetooth device, wherein said feedback message indicates a status of said adjusting.

2. The method according to claim 1, comprising requesting said transmit power adjustment via a Link Management Protocol (LMP) message.

3. The method according to claim 1, wherein said one or more operating modes comprise a Bluetooth Basic Rate (BR) mode.

4. The method according to claim 1, wherein said one or more operating modes comprise a Bluetooth Enhanced Data Rate (EDR) mode.

5. The method according to claim 1, wherein said received step size is encoded utilizing 4 bits of the one-byte reserved field.

6. The method according to claim 1, comprising determining whether said first Bluetooth device is operable to utilize fast power control.

7. The method according to claim 6, comprising generating and/or receiving an increase power message when said first Bluetooth device is operable to utilize said fast power control.

8. The method according to claim 7, comprising generating and/or receiving said step size corresponding to said increase power message when said first Bluetooth device is operable to utilize said fast power control.

9. The method according to claim 6, comprising generating and/or receiving a decrease power message when said first Bluetooth device is operable to utilize said fast power control.

10. The method according to claim 9, comprising generating and/or receiving said step size corresponding to said decrease power message when said first Bluetooth device is operable to utilize said fast power control.

11. The method according to claim 1, wherein the first set of bits comprises four bits, and the second set of bits comprises four bits.

12. A system for communication, the system comprising:
    one or more processors, one or more circuits, or any combination thereof in a second Bluetooth device, wherein said one or more processors, one or more circuits, or any combination thereof are operable to:
        receive from a first Bluetooth device, a request for a transmit power adjustment for one or more operating modes, the request including a one-byte reserved field that is reserved according to a Bluetooth specification for a transmit power adjustment request format;
        receive a step size for said transmit power adjustment via said received request, the step size being encoded in the one-byte reserved field, wherein a first set of bits of the one-byte reserved field are employed for encoding the step size when the transmit power adjustment pertains to a Bluetooth Basic Rate (BR) mode, and a second set of bits of the one-byte reserved field are employed for encoding the step size when the transmit power adjustment pertains to a Bluetooth Enhanced Data Rate (EDR) mode;
        adjust said transmit power as a function of said step size; and
        send a feedback message to said first Bluetooth device, wherein said feedback message indicates a status of said adjusting.

13. The system according to claim 12, wherein said one or more processors, one or more circuits, or any combination thereof request said transmit power adjustment via a Link Management Protocol (LMP) message.

14. The system according to claim 12, wherein said one or more operating modes comprise a Bluetooth Basic Rate (BR) mode.

15. The system according to claim 12, wherein said one or more operating modes comprise a Bluetooth Enhanced Data Rate (EDR) mode.

16. The system according to claim 1, wherein said receive step size is encoded utilizing 4 bits of the one-byte reserved field.

17. The system according to claim 12, wherein said one or more processors, one or more circuits, or any combination thereof determine whether said first Bluetooth device is operable to utilize fast power control.

18. The system according to claim 17, wherein said one or more processors, one or more circuits, or any combination thereof generate, receive, or both generate and receive an increase power message when said first Bluetooth device is operable to utilize said fast power control.

19. The system according to claim 18, wherein said one or more processors, one or more circuits, or any combination thereof generate, receive, or both generate and receive said step size corresponding to said increase power message when said first Bluetooth device is operable to utilize said fast power control.

20. The system according to claim 17, wherein said one or more processors, one or more circuits, or any combination thereof generate, receive, or both generate and receive a decrease power message when said first Bluetooth device is operable to utilize said fast power control.

21. The system according to claim 20, wherein said one or more processors, one or more circuits, or any combination thereof generate, receive, or both generate and receive said step size corresponding to said decrease power message when said first Bluetooth device is operable to utilize said fast power control.

22. The system according to claim 12, wherein the first set of bits comprises four bits, and the second set of bits comprises four bits.

23. A system, comprising:
   means for receiving from a first Bluetooth device, a request for a transmit power adjustment for one or more operating modes, the request including a one-byte reserved field that is reserved according to a Bluetooth specification for a transmit power adjustment request format;
   means for receiving a step size for said transmit power adjustment via said received request, the step size being encoded in the one-byte reserved field, wherein a first set of bits of the one-byte reserved field are employed for encoding the step size when the transmit power adjustment pertains to a Bluetooth Basic Rate (BR) mode, and a second set of bits of the one-byte reserved field are employed for encoding the step size when the transmit power adjustment pertains to a Bluetooth Enhanced Data Rate (EDR) mode;
   means for adjusting said transmit power as a function of said step size; and
   means for sending a feedback message to said first Bluetooth device, wherein said feedback message indicates a status of said adjusting.

24. The system according to claim 23, wherein the first set of bits comprises four bits, and the second set of bits comprises four bits.

* * * * *

UNITED STATES PATENT AND TRADEMARK OFFICE
CERTIFICATE OF CORRECTION

PATENT NO. : 8,275,316 B2  
APPLICATION NO. : 12/700997  
DATED : September 25, 2012  
INVENTOR(S) : Ding Page 1 of 1

It is certified that error appears in the above-identified patent and that said Letters Patent is hereby corrected as shown below:

In the Claims  
Column 12, line 5, replace "a" with --the--  
Column 12, line 5, remove "Basic Rate (" and ")"  
Column 12, line 8, replace "a" with --the--  
Column 12, lines 8 and 9, remove "Enhanced Data Rate (" and ")"  
Column 12, line 16, after "generating" add --,--  
Column 12, line 17, remove "and/or"  
Column 12, line 17, after "receiving" add --, or both generating and receiving--  
Column 12, line 19, after "generating" add --,--  
Column 12, line 20, remove "and/or"  
Column 12, line 20, after "receiving" add --, or both generating and receiving--  
Column 12, line 23, after "generating" add --,--  
Column 12, line 24, remove "and/or"  
Column 12, line 24, after "receiving" add --, or both generating and receiving--  
Column 12, line 27, after "ing" add --,--  
Column 12, line 27, remove "and/or"  
Column 12, line 27, after "receiving" add --, or both generating and receiving--  
Column 12, line 63, replace "a" with --the--  
Column 12, line 63, remove "Basic Rate (" and ")"  
Column 12, line 66, replace "a" with --the--  
Column 12, line 66, remove "Enhanced Data Rate (" and ")"  
Column 13, line 1, replace "1" with --12--

Signed and Sealed this  
Eleventh Day of March, 2014

Michelle K. Lee  
*Deputy Director of the United States Patent and Trademark Office*